June 23, 1931.                    J. L. DRAKE                    1,811,044
                        SHEET GLASS SURFACING APPARATUS
                  Filed Feb. 18, 1927        2 Sheets-Sheet 2
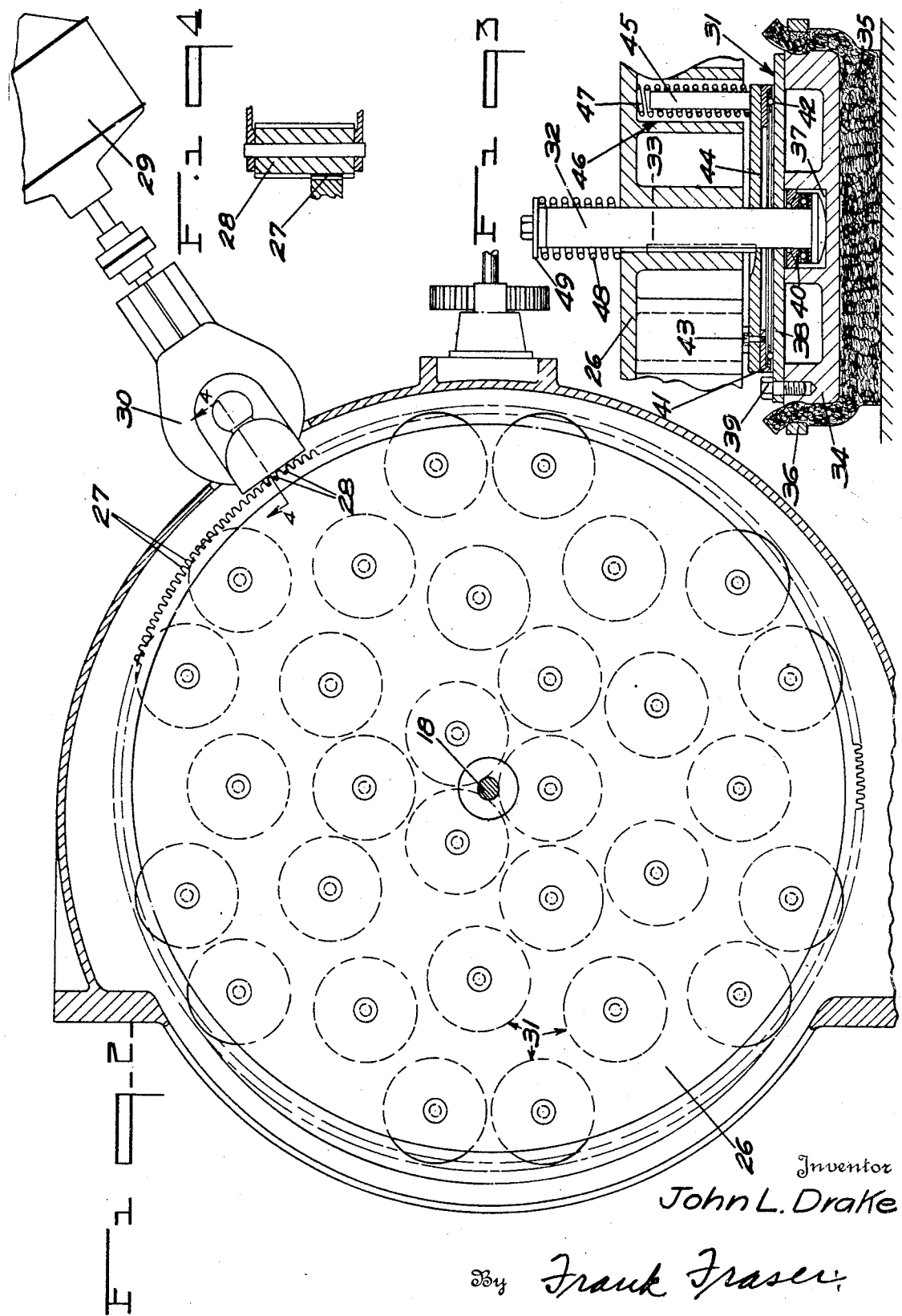
Inventor
John L. Drake
By Frank Fraser,
Attorney Patented June 23, 1931

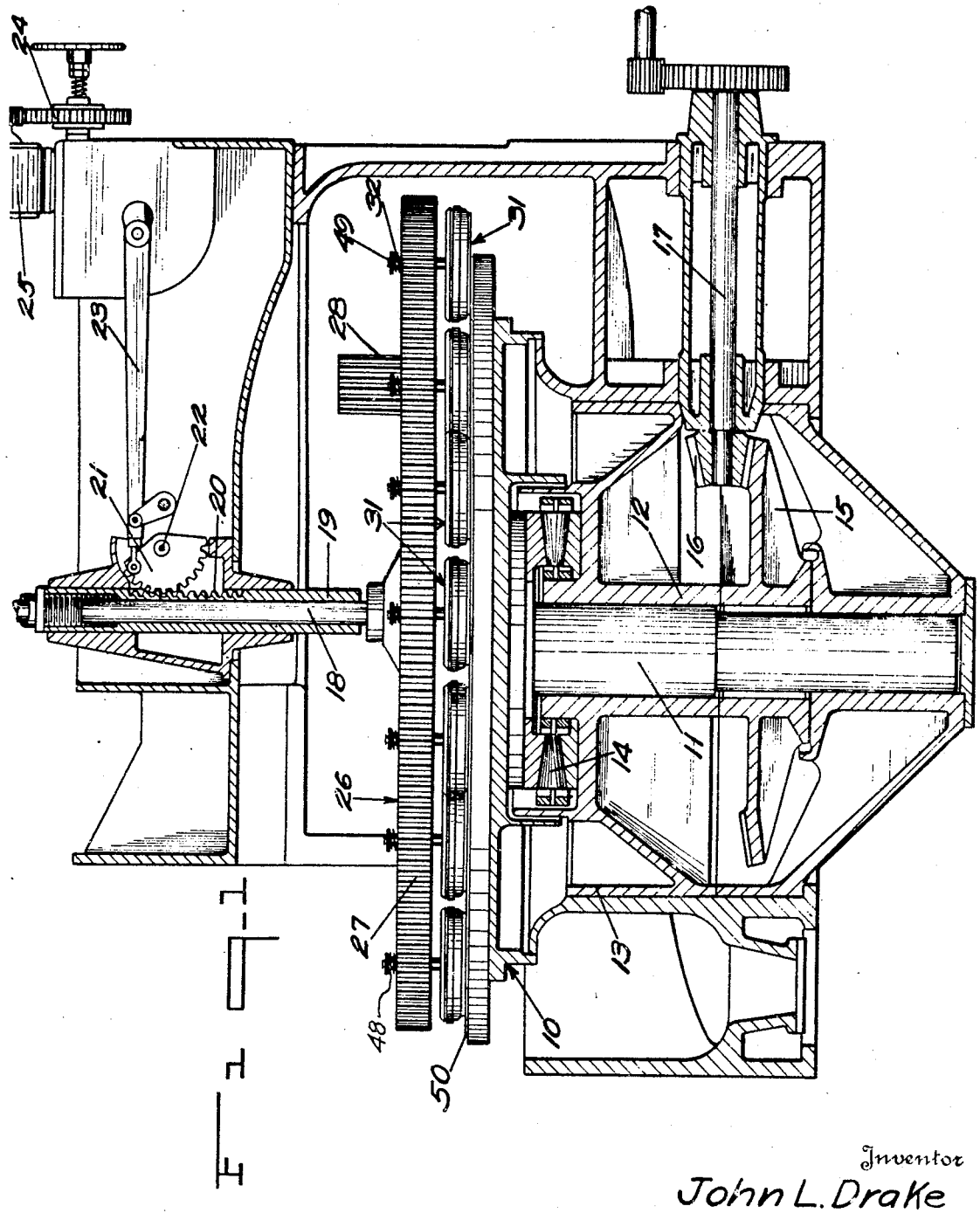

1,811,044

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

SHEET GLASS SURFACING APPARATUS

Application filed February 18, 1927. Serial No. 169,207.

The present invention relates to a method and apparatus for surfacing sheet glass.

An important object of the present invention is to provide improved surfacing apparatus primarily adapted for the surfacing of flat glass and including means whereby the surfacing members or tools are moved upon the sheet to surface the same.

Another object of the invention is to provide improved surfacing apparatus of this nature, wherein the surfacing members are carried in a predetermined circular path upon the sheet being surfaced while at the same time rotating freely about their own axes whereby to permit the sheet to be surfaced in a minimum amount of time.

Another object of the invention is to provide in surfacing apparatus of this nature, improved means for positively rotating the surfacing members about a center offset from the center of the sheet being surfaced, while at the same time permitting said member to rotate freely about their own axes thereby creating a more efficient surfacing action.

A further object of the invention is the provision of new and novel means for varying and controlling the pressure of the surfacing members upon the glass sheet being surfaced.

A still further object of the invention is to provide sheet glass surfacing apparatus of this nature including a plurality of surfacing members adapted to rest upon the glass being surfaced, and means for varying and controlling the pressure upon the glass sheet to the end that the pressure exerted thereon will be greater or less than, or substantially equal to the weight of said surfacing members.

Still another important object of the present invention is to provide a method for surfacing sheet glass which consists in beginning the surfacing operation with the surfacing members exerting a predetermined amount of pressure upon the glass and driven at one speed, and ending said surfacing operation with the surfacing members exerting a varying pressure on the glass and being driven at a different speed.

Other objects and advantages of the invention will become more apparent during the course of the following description when taken in connection with the accompanying drawings.

In the drawings, forming a part of this application and wherein like numerals are employed to designate like parts throughout the same, Fig. 1 is a vertical section through improved sheet glass apparatus constructed in accordance with the present invention, the surfacing members and supporting and driving means therefor being shown in elevation.

Fig. 2 is a diagrammatic top plan view of the surfacing members and apparatus for driving the same.

Fig. 3 is a vertical sectional view through one of the surfacing members, and

Fig. 4 is a detail section taken on line 4—4 of Fig. 2.

In the drawings, the sheet supporting table designated in its entirety by the numeral 10, is mounted at the upper end of a vertical column 11 which is freely rotated in bearings 12 within the frame work 13. The table is preferably supported upon suitable roller bearings 14 and rotated by a large bevelled gear 15 driven through a bevelled pinion 16 keyed to shaft 17, said shaft being rotated from any suitable source of power such as an electric motor.

Arranged above the rotatable table 10 is a vertical rotatable shaft 18, said shaft being off-set from the center of the table and operating through a sleeve 19 having a racked portion 20. Engagable with said racked portion 20 is a segmental gear 21 rockable about a shaft 22 by means of a pitman 23, which pitman is associated with a drive gear 24, driven by a suitable motor or the like 25. In Fig. 1, the shaft 18 is shown in its lowered or operative position and by rocking the segmental gear 21 as described, the sleeve 19 can be raised causing the shaft 18 to be also raised.

Keyed to the lower end of the shaft 18 is a horizontal circular supporting member 26 provided around its periphery or edge with gear teeth 27. In other words, the supporting member 26 is simply a large solid gear. Adapted to be in constant mesh with the teeth 27 of the supporting member 26 is a gear 28 driven from a motor 29 through the medium of suitable reducing gearing located in the casing or housing 30. Thus, upon rotation of the gear 28, the supporting member 26 and shaft 18 will also be rotated. As will be noted, the teeth of the gear 28 are relatively longer than the teeth 27 of the supporting member 26 so that said supporting member can be raised or lowered as desired without disengaging the gears and thereby stopping the rotation thereof.

Carried by the supporting member 26 are a plurality of surfacing members or polishing blocks, each being designated in its entirety by the numeral 31 and being carried upon the lower end of a vertical spindle 32 which passes upwardly through the supporting member 26 and is slidably keyed thereto by means of a key 33. Each polishing block 31 comprises a weighted member or block 34 over the bottom face of which is clamped a pad 35 of felt or other suitable material, by means of the ring 36. The weighted block 34 is provided with a centrally disposed recess 37 covered by a plate 38 secured to said block by means of bolts or the like 39.

The lower end of the spindle 32 passes through the plate 38 and is received within the recess 37. Secured to said spindle within said recess is a thrust bearing 40 which is adapted to support the weight of the polishing block when the same is raised a predetermined distance. Arranged on top of the plate 38 is a ring guide 41 for the thrust bearings 42 and secured to the ring 41 by means of bolts or the like 43 is a plate 44. This plate 44 is provided with or carries a plurality of vertical pins 45 which are received within depending pockets 46 formed on the supporting member 26. Encircling each of these pins 45 is a compression spring 47 bearing at its opposite ends against the said supporting member 26 and plate 44. Encircling the upper end of each spindle 32 is a compression spring 48 bearing at its lower end against the supporting member 26 and at its upper end against a collar or plate 49.

In the operation of the present invention, the sheet of glass 50 to be surfaced, is first placed upon the table 10 and this glass may be either secured in position or freely mounted within a recess. The segmental gear 21 is then operated by the pitman 23 to lower the surfacing members or polishing blocks 31 onto the sheet 50 after which the motor 29 is started so as to rotate the gear 28. Upon rotation of this gear, the supporting member 26 will also be rotated to carry the polishing blocks 31 about a center off-set from the center of the sheet while, at the same time, the said polishing blocks will be permitted to freely rotate about their own axes. In this way, a more efficient surfacing action is created whereby to permit the sheet to be surfaced in a minimum amount of time.

The present invention also comprehends means for varying and controlling the pressure of the polishing blocks upon the glass sheet being surfaced. To this end, the polishing blocks 31 are adapted to be raised and lowered so that the pressure exerted upon the glass will be more or less than, or substantially equal to the weight of said blocks. For instance, if it is desired that the pressure upon the glass be greater than the weight of the polishing blocks, the supporting member 26 is lowered until the weight thereof rests upon the plates 44. Thus, when this is done, the pressure upon the glass will be equal to the combined weight of the said polishing blocks and supporting member.

As the supporting member 26 is raised out of contact with the plates 44, the pressure of the polishing blocks upon the glass sheet will be controlled by the compression springs 47 and this pressure naturally decreases as the said supporting member 26 is raised and the action of the said springs lessened so that when the supporting member has been raised to a predetermined position, the said springs 47 will no longer function and the pressure upon the glass will be substantially equal to the weight of the polishing block only. Thus, various intermediate degrees of pressure can be obtained by raising and lowering the said supporting member.

Upon continued raising of the supporting member 26 however, the springs 48 being compressed beyond a predetermined point will be brought into action to raise the polishing blocks 31 and when this is done, the pressure upon the glass will be less than that of the said polishing blocks. By regulating the pressure of the polishing blocks upon the glass in the above manner, the polishing action together with the speed at which the glass is surfaced can be varied and controlled.

In the preferred method for surfacing sheet glass in accordance with the improved apparatus above described, the surfacing operation is started with the surfacing members or polishing blocks exerting a relatively heavy pressure upon the glass and being driven at a relatively slow speed while the said surfacing operation is finished with the polishing blocks exerting a lighter pressure upon the glass and being driven at a relatively faster speed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass surfacing apparatus, a horizontal supporting member rotatable about a substantially vertical axis, and a plurality of polishing members carried by said supporting member, each polishing member including a vertical spindle projecting upwardly through said supporting member and slidably keyed thereto, a compression spring encircling said spindle above said supporting member, a plurality of vertical pins supported by said polishing member and received within pockets formed in the underside of said supporting member, and compression springs encircling said pins within said pockets.

2. In glass surfacing apparatus, a horizontal supporting member rotatable about a substantially vertical axis, a plurality of polishing members carried by the supporting member and adapted for vertical sliding movement with respect thereto, each polishing member including a vertical spindle slidably keyed within the supporting member, and a plurality of springs supported by each polishing member and received within pockets formed in the underside of the surfacing member for normally urging said polishing members downwardly with respect to said supporting member.

3. In glass surfacing apparatus, a horizontal supporting member rotatable about a substantially vertical axis, a plurality of polishing members carried by the supporting member and adapted for vertical sliding movement with respect thereto, each polishing member including a vertical spindle slidably keyed within the supporting member, a plurality of vertical pins supported by each polishing member and received within pockets formed in the underside of said supporting member, and compression springs encircling the pins within said pockets.

4. In glass surfacing apparatus, a horizontal supporting member rotatable about a substantially vertical axis, and a plurality of polishing members carried by said supporting member, each polishing member including a vertical spindle projecting upwardly through said supporting member and slidably mounted with respect thereto, a compression spring encircling said spindle above the supporting member, a plurality of vertical pins supported upon the polishing member and positioned beneath said supporting member, and compression springs encircling said pins for normally urging said polishing member downwardly.

5. In glass surfacing apparatus, a horizontal supporting member rotatable about a substantially vertical axis, and a plurality of polishing members carried by said supporting member, each polishing member including a polishing block and a vertical spindle projecting upwardly through said supporting member and slidably mounted with respect thereto, said polishing block having a recess for receiving the lower end of the spindle therein, a plate secured to the top of said block and forming a closure for the recess, a plurality of vertical pins supported upon said plate, a compression spring encircling the spindle above the supporting member, and compression springs encircling the pins beneath the supporting member for normally urging the polishing block downwardly.

6. In glass surfacing apparatus, a horizontal supporting member rotatable about a substantially vertical axis, and a plurality of polishing members carried by said supporting member, each polishing member including a polishing block and a vertical spindle projecting upwardly through said supporting member and slidably keyed thereto, said polishing block having a recess for receiving the lower end of the spindle therein, a thrust bearing carried by the spindle within the recess, a plate secured to the top of said block and forming a closure for the recess, a plurality of vertical pins carried by said plate and received within pockets formed in the underside of the supporting member, a compression spring encircling said spindle above said supporting member, and compression springs encircling said pins within said pockets for normally urging the polishing block downwardly.

Signed at Toledo, in the county of Lucas and State of Ohio, this 15th day of February, 1927.

JOHN L. DRAKE.